March 3, 1964 W. KENYON 3,123,326
VARIABLE ATTITUDE EJECTION SEAT WITH QUICK RETURN DEVICE
Filed July 3, 1961 3 Sheets-Sheet 1
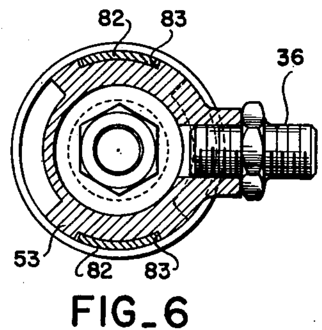
FIG_6
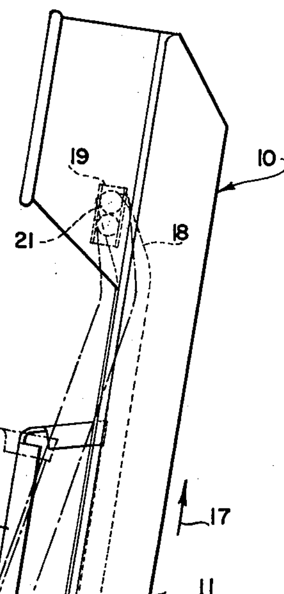
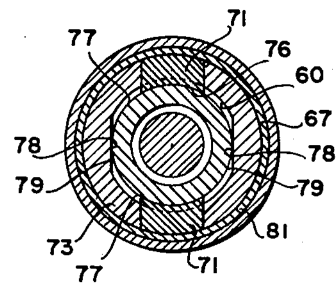
FIG_5
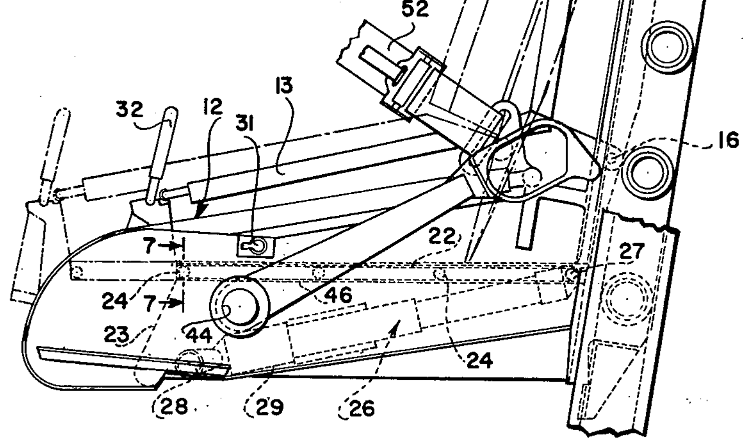
FIG_1
INVENTOR.
WILFRED KENYON
BY George C. Sullivan
Agent

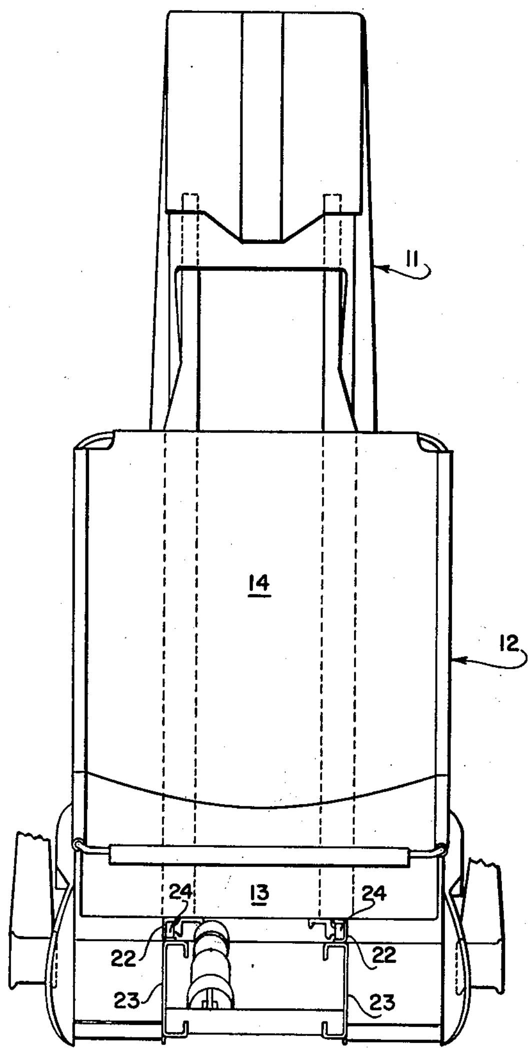
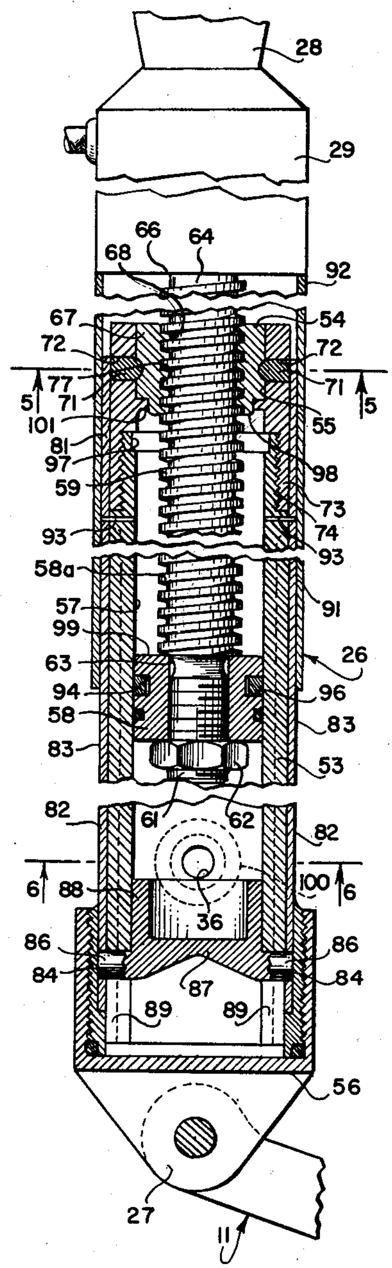
INVENTOR.
WILFRED KENYON
BY George A. Sullivan
Agent

March 3, 1964 W. KENYON 3,123,326
VARIABLE ATTITUDE EJECTION SEAT WITH QUICK RETURN DEVICE
Filed July 3, 1961 3 Sheets-Sheet 3
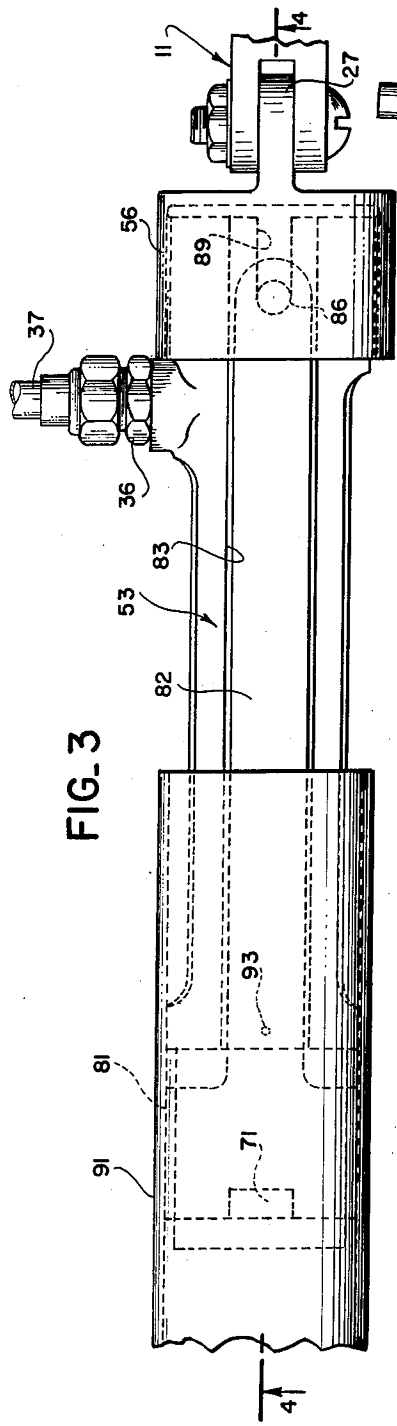
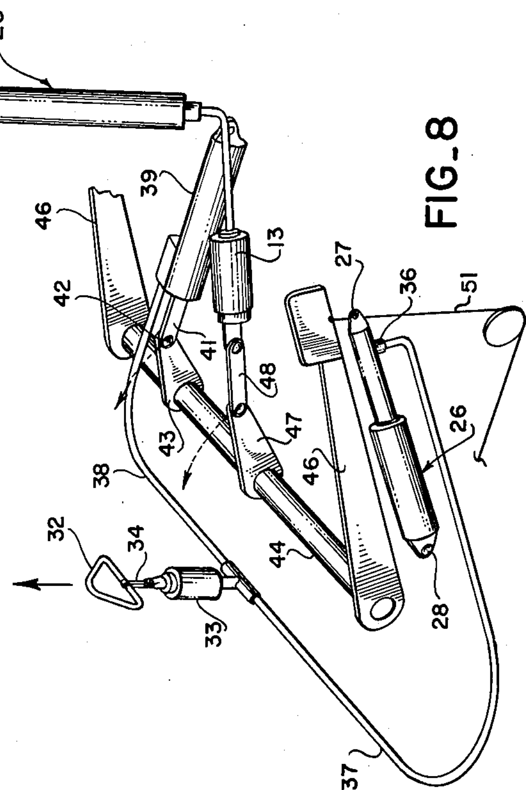
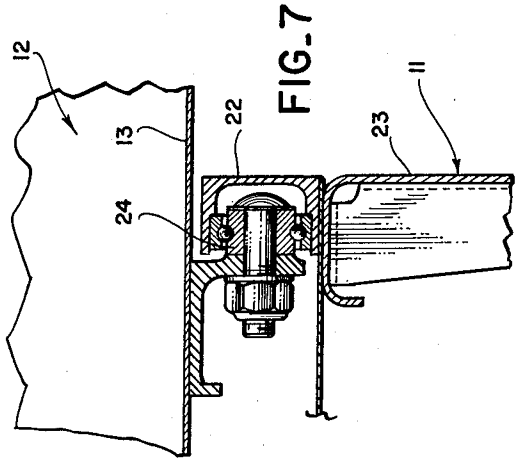
INVENTOR.
WILFRED KENYON
BY George A. Sullivan
Agent United States Patent Office 3,123,326
Patented Mar. 3, 1964

1

2

3,123,326

VARIABLE ATTITUDE EJECTION SEAT WITH QUICK RETURN DEVICE

Wilfred Kenyon, Santa Monica, Calif., assignor to Lockheed Aircraft Corporation, Burbank, Calif.

Filed July 3, 1961, Ser. No. 121,767
11 Claims. (Cl. 244—122)

This invention relates to an ejection seat and more particularly to a variable attitude ejection seat with a quick return device in which a seat, such as a pilot's seat and the like, which is equipped with catapult means for ejection thereof in emergencies, is provided with means for selectively varying the seat attitude into reclining positions to reduce pilot fatigue during long flights and with means for quickly returning the reclined seat to an ejection attitude prior to catapulting of the seat.

In the past, due to the increased speed of aircraft, ejection devices have been developed to catapult the entire pilot's seat when an emergency occurs in which the pilot must abandon the aircraft so that the pilot is thrown clear of the aircraft before he can safely open his parachute to descend to the ground. Such aircraft, namely, those propelled by jet propulsion were, at first, because of the increased rate of consumption of fuel, limited in length of flight and there was no necessity for changing the attitude of the pilot's seat during such short flights; therefore, the seat was always in a correct attitude for ejection thereof, wherein the back of the seat is supported in the correct position to align the spine of the pilot with the force of the catapult to eject the seat. However, due to the evolution of the aircraft, flight time is being constantly increased to a point where pilot fatigue from lack of change of position is rapidly becoming a hazardous factor during flight. Varying a seat attitude of the pilot helps to stimulate the blood circulation and reduce fatigue during relatively long flights by providing means wherein seat attitude may be varied in selective reclining positions and thereby increasing the prospect of successful mission accomplishment. However, it is important that the seat, when ejected in the event that an emergency arises wherein the pilot must abandon the aircraft, is positioned so as to position the spine substantially parallel to the ejection force to avoid spinal injury from the force. Therefore, the seat must be returned to its ejection attitude prior to applying the catapult force to eject the seat. Time, being a factor, the seat means must, in addition, be quickly returned to its ejection position by means over-riding the relatively slow moving means for varying the attitude of the seat in its reclining positions.

This invention provides a new and improved electromechanical actuator which is preferably operated by power means to vary the angular attitude of a seat pivotally mounted relative to an ejection frame having actuator means for conveniently adjusting the attitude of the seat so as to reduce the fatigue of the occupant of the seat and which provides means for over-riding the actuator so as to quickly return the seat into its normal attitude parallel to the ejection frame prior to actuation of the catapult means to eject the entire seat and frame from the aircraft.

Normally, several operations are performed to prepare the pilot for ejection in which the pilot is quickly and automatically readied for the ejection in response to actuation of the catapult means. To initiate ejection, the pilot pulls a single actuator, such as a D-ring, which then activates several pre-ejection operations in which, for example, a lap safety belt is tightened, the legs of the pilot are drawn inwardly and leg braces are shifted into position to brace the legs against a spreading force resulting from ejection. These operations must occur prior to actual ejection of the seat frame by extension of a catapult cylinder in response to firing of a catapult initiator in the form a pyrotechnic cylinder, capsule or the like. This invention provides means whereby a first initiator is fired to perform the pre-ejection operations and automatically position the seat means in its correct ejection attitude in which the back thereof is substantially parallel to the ejection frame prior to actuation of the catapult device by a second initiator to eject the ejection frame. In this frame, the pilot is quickly and effectively positioned and readied in a correct and safe ejection attitude prior to actuation to eject the seat. Other operations are also performed prior to the ejection such as opening of the escape hatch which are well-known in the art and are not to be considered in this application, such operations to be assumed as being normally effected in the normal manner in response to pulling of the D-ring.

It is, therefore, an object of this invention to provide a new and improved ejection apparatus which is selectively operable for varying the angular relationship of a seat to an ejectable frame for varying the pilots attitude relative to the ejection frame into selective reclining attitudes and which is automatically positioned into a correct ejection attitude prior to ejection of the entire seat and frame from an aircraft.

Another object of this invention is to provide a new and improved ejection seat in which the seat when in a reclining attitude is quickly and readily positioned in the correct ejection attitude.

A further object of this invention is to provide a new and improved actuator for the ejection seat of the character described which provides means for more conveniently varying the attitude of the seat relative to the normal ejection position of the ejection frame of the seat.

Still another object of this invention is to provide a new and improved actuator which includes means for automatically locking the actuator in an extended position for locking the seat in its correct ejection attitude prior to ejection of the ejection frame.

Another object of this invention is to provide a new and improved means for initiating the actuator to position the seat in the correct ejection position and means for actuating the initiator prior to the initiator force for catapulting the entire seat and frame, such means being automatically and chronologically operated to assure correct positioning of the seat to an ejection attitude prior to ejection of the seat and frame.

A still further object of this invention is to provide a new and improved ejection seat in which the actuator is normally prevented from positioning the seat into the ejection attitude and in which the said means is over-ridden in response to energization of the initiator means to position the seat in its correct ejection attitude.

A general object of this invention is to provide a new and improved variable attitude ejection seat with a quick return device which overcomes disadvantages of prior means and methods heretofore intended to accomplish generally similar purposes.

These and other objects of this invention will be more apparent from the following detailed description, drawings and appending claims.

In the drawings:

FIGURE 1 is a side view, in elevation, of a variable attitude ejection seat of this invention;

FIGURE 2 is a front side view, in elevation thereof;

FIGURE 3 is a fragmentary top plan view, in elevation, of the actuator means thereof;

FIGURE 4 is a vertical cross-sectional view as taken substantially along the line 4—4 of FIGURE 3, with parts shown in elevation;

FIGURE 5 is a vertical cross-sectional view as taken substantially along line 5—5 of FIGURE 4;

FIGURE 6 is a vertical cross-sectional view as taken substantially along the line 6—6 of FIGURE 4;

FIGURE 7 is a fragmentary cross-sectional view as taken substantially along the line 7—7 of FIGURE 1;

FIGURE 8 is a fragmentary, perspective view, showing schematically the ejection system of this invention.

Referring in detail to the drawings there is shown by way of illustration, but not of limitation, an ejection seat designed and constructed in accordance with this invention and generally designated by the numeral 10. The ejection seat 10 includes an ejection frame 11 adapted to be catapulated away from its foundation (not shown) in response to actuation of catapult means schematically indicated by the numeral 25 in FIGURE 8 which in turn is actuated by a catapult initiator 13. The foundation, referred to above, would normally be the floor or other structure of an aircraft supporting the ejection seat 10 from which the frame 11 is catapulted when an emergency arises in which the occupant of the seat is forced to abandon the aircraft.

A secondary seat means 12 which supports the pilot or other occupant in the aircraft, includes a pan seat 13 and an integral back 14 which are pivotally secured together at a pivot point designated by the numeral 16 for pivotal movement relative to one another and to the ejection frame 11 from a normal ejection attitude wherein the back 14 is substantially parallel to the frame 11 and to the line of direction of ejection of the frame 11, as indicated by the arrowed line 17, and to varying reclining attitudes one of which is designated by the broken line 12' in which the back, referred to by the numeral 14', has variable angular relationship to the ejection frame 11. The seat means 12 is pivotally mounted on the pivot axis 16 with an upper end 18 of the back 14 movably mounted relative to the frame 11 in opposed channels 19 secured to the frame 11 by virtue of opposed rollers 21 reciprocable in the channels 19. The pan seat 13 is similarly supported in a pair of opposed channel members 22 secured as to forwardly extending upstanding web member 23 of the frame 11 as by a plurality of opposed rollers 24 secured to the outer sides of the seat pan 13. The seat means 12 is thereby pivotal relative to the ejection frame 11, from the solid line position, indicated by the numeral 12, in which the back 14 is substantially parallel to the frame 11 and to the line of direction of ejection and into the broken line position 12' which is an extreme reclining position, the rollers 24 being guided in the channel members 22 and the rollers 21 being guided in the channel members 19.

An actuator, generally designated by the numeral 26, is secured to the frame 11 and to the seat means 12 to control the ejection and reclining positions of the seat means 12 relative to the ejection frame 11 for determining the angular position of the seat means relative to the ejection frame. The actuator 26 is secured at one end 27 to a rear portion of the seat means 12 and at its opposite end 28 to the ejection frame 11, or more particularly, to the forwardly extending webs 23 of the frame 11 and is selectively operable to extend and retract for pivoting the seat means 12 into an upright ejecting position and a reclining position, respectively, as will be hereinafter described.

A power means 29 of the actuator 26 is manually initiated by the occupant of the seat means 12, as by a reversible switch 31 conveniently located on the frame 11 within reach of the occupant and connected in an electrical circuit (not shown), to energize the motor 29 to either extend or retract the actuator 26 in a manner to either position the seat means into the erect ejection position or to pivot the seat means relative to the ejection frame 11 into a reclining position, respectively.

In the event that an emergency arises wherein the pilot or occupant of the seat must abandon the aircraft, means are provided whereby a single control handle or D-ring, designated by the numeral 32, is pulled for automatically extending the actuator means 26 to position the seat means 12 into the correct ejection position shown in the solid lines of FIGURE 1 and subsequently actuating the seat ejection catapult 12 to catapult the seat frame 11 from the foundation, namely the aircraft.

When the D-ring 32 is pulled, a primary initiator 33 connected to the initiator as by a cable 34, is fired to release gas under pressure into one end of the actuator 26 as at 36 through a flexible conduit 37 and at the same time, through a flexible conduit 38 admit the gas to one end of a cylinder 39. The initiator 33 is preferably of a pyrotechnic type which when fired releases a gas under high pressure to the conduits 37 and 38. The initiator 33 may optionally be in capsule or cartridge form and contain a gas under high pressure with means for selectively releasing the gas in response to pulling the D-ring.

When the initiator 33 is fired, the actuator 26 is caused to be fully extended, as will be hereinafter described, to position the seat means 12 in its correct ejection position relative to the ejection frame 11 and at the same time cause the cylinder 39 to extend its piston rod 41, which has an outer end 42 connected to a lug 43 fixed on a rotatable shaft 44 transversely supported on the ejection frame 11, to rotate the shaft 44. When the shaft 44 is rotated, a pair of spaced leg braces 46 secured to the ends of the shaft 44 are pivoted upwardly into a substantially erect position suitable for bracing the legs of the occupants of the chair to counteract normal spreading force applied to the legs of the occupant during ejection so as to hold them from spreading, and also rotate a lug 47 rotatable with the shaft 44 to actuate, through a time delay link 48, the catapult initiator 13, thus actuating the catapult means 25 subsequent to positioning of the seat means 12 in its correct ejection position. A leg retraction cable, indicated by the numeral 51 is preferably secured in a suitable manner to a leg brace 46 for retracting the legs of the pilot into a correct ejection position as well-known in the art. Further in response to the firing of the primary initiator, means are provided for tightening the lap belt 52 into a correct tightened position relative to the occupant prior to actuation of the catapult initiator 13 by the linkage 48, the means being well-known and therefore not shown in the drawings of the application.

As best seen in FIGURES 3 to 6, inclusive, the actuator means 26 generally comprises a cylinder 53 having an open end 54 and closed at its opposite end by a cap 56 which is pivotally secured to the frame 11 as at 27. The cylinder 53 is provided with a longitudinal bore 57 in which a piston 58 is reciprocally mounted for linear movement relative to the cylinder. A piston rod *58a* is provided with an external helical thread 59 and a reduced end 61 which is secured to the piston 58 as by a nut 62 having a threaded engagement with external threads of the reduced end 61 and clamping the piston 58 between the nut 62 and a shoulder 63 formed at the junction of the reduced end 61 and the screw threaded portion *58a* of the piston rod. The opposite end 64 of the piston rod *58a* is secured in a suitable manner to a motor driven shaft 66 of the motor 29 and is thereby indirectly pivotally secured at the pivot point 28 to the web 23 of the frame 11 whereby, when the motor 29 is actuated for rotation of the shaft 66 in one direction, the screw rod in 58*a* is rotated in one direction and conversely, when the motor 29 is actuated to rotate the shaft 66 in an opposite direction, the screw shaft 58*a* is operated in an opposite direction.

A nut member 67 is slidably mounted in the open end 54 of the cylinder 53 and is provided with internal threads 68 engaged with the threads 59 of the screw thread 58*a*. The nut members 67 is retained in the open end of the cylinder 53 by a releasable holding means. The releasable holding means includes a pair of opposed key members 71 extending through transverse slots 72 of an extension 73 forming the open end of the cylinder 53 and having a threaded engagement 74 therewith. The keys 71, as best seen in FIGURES 4 and 5, have arcuate inner ends 76 engaged in opposed arcuate grooves 77 of the nut member 67 for preventing linear movement of the nut 67 relative to the open end 54 and in the bore 60. The bore 60 is preferably provided with a pair of opposing flats 78 complementary to opposing flats 79 of the nut member 67 to prevent rotation of the nut member 67 relative to the cylinder 53.

A cylindrical sleeve 81 surrounds the extension 73 to enclose the keys 71 to prevent lateral movement of the keys 71 relative to the cylinder 53 and to retain the keys 71 in engagement with the opposing grooves 77 of the nut member 67. The sleeve 81 is slidable relative to the exterior of cylinder 53. Each arm 82 is provided with an aperture 84 for receiving opposing pins 86 which extend laterally and diametrically from a releasing actuator member 87 disposed within the bore 57 of the cylinder 53. The releasing member 87 has an inwardly directed annular skirt 88 slidable within the bore 57 and has its laterally extending pins 86 slidable in longitudinal slots 89 extending outwardly through the wall of the cylinder 53 so as to be slidable in the slots. The pins 86 are thereby slidable in the slots 89 as, in response to actuation of the initiator 33 as will be hereinafter described, to bias the arms 82 and the sleeve 81 in a direction, to the right as viewed in FIGURE 4, to uncover the keys 71 for a purpose to be hereinafter described.

An outer sleeve 91 preferably surrounds the cylinder 53 and the sleeve 81 and is secured at one end 92 as to the motor 29 to form a bearing for the cylinder 53. The sleeve 91 is preferably integral with the housing of the motor 29 or is optionally secured thereto in any suitable manner. The sleeve 81 is preferably temporarily secured to the cylinder 53 as by a pair of opposed shear pins 93 extending through the sleeve 91 and the cylinder wall 53 whereby the sleeve 81 is locked to the cylinder 53 until such time as is desired to operate the sleeve to uncover the keys 71 and in a manner to be hereinafter described.

As will now more clearly be understood from the foregoing description, the actuator 26 is extendable and retractable in response to energization of the motor 29 to rotate the screw shaft 58*a* relative to the nut 67 which is non-rotatably held in the cylinder 53 to extend or retract the actuator 26 to pivot the seat means 12 in variable reclining attitudes relative to the ejection frame 11. The seat means 12 is prevented from reaching its erect ejection position, wherein the actuator 26 is fully extended, by the abutment of an annular extension 98 on the nut member 67 which is abuttable with the inner end 99 of the piston 58. In response to actuation or firing of the primary initiator 33, gas under pressure is admitted into the internal chamber 100 of the cylinder 53 as through the radial port 36. The gas thereby expands in the chamber 100 to act upon the releasing actuator 87 and move the actuator 87 to the right as seen in FIGURE 3 to slide the pins 86 in the opposed slots 89 and move the fingers 82 and the sleeve 81 to the right, the fingers 82 being slidable in the opposed grooves 83 of the exterior of the cylinder 53. Then the arms 82 move to the right and sleeve 81 uncovers the keys 71. At the same time the expanding gas is acting upon the piston 58 to bias the piston toward the left, as viewed in FIGURE 4, thereby placing an axial force against the threads 59, nut member 67 and the inner arcuate ends of the keys 71. The keys, now being free to move radially relative to the cylinder 53 are then slid laterally relative to the cylinder by a camming action of the angular grooves 77 against the inner ends 76 to release the nut member 67 for axial movement with the screw shaft 58*a* whereby the cylinder 53 axially moves to the left and outwardly of the open end 54, namely the bore 55, so that the expansion of the gas extends the actuator 26 to its fully extended position. The force created within the chamber 100 is sufficient to cause the sleeve 81 to shear the pins 93 permitting axial movement of the sleeve relative to the cylinder 53 to uncover the keys 71. In the fully extended position of the actuator, the inner end 99 of the piston 58 bottoms against an internal annular shoulder 101 formed in the bore 57, such bottoming being possible by virtue of the fact that in response to the axial movement of the cylinder 53 outwardly of the cylinder, the annular extension 98 is moved therewith. In the bottoming position of the piston 58, the expandable annular member 94 is aligned with the annular groove 97 of the cylinder to expand therein. The annular member when expanded, forms a key between the cylinder 53 and the piston 58, by virtue of its thickness to lock the cylinder relative to the piston rod 58*a*. When the actuator 26 is fully extended and locked, the linkage 47—48 causes the catapult initiator 13 to be fired and thereby cause the seat ejection catapult 12 to eject the ejection frame 11. In this manner, the seat means 12 is positioned in its correct ejection attitude relative to the frame 11 and locked in such attitude prior to initiation of the catapulting force to eject the frame 11.

While there is herein shown and described what is conceived to be the most practical and preferred embodiment of this invention, it is recognized that departures may be made therefrom within the scope of this invention which is not limited to the details disclosed herein but is to be accorded the full scope of the claims so as to embrace any and all equivalent devices.

What is claimed as new and desired to secure by Letters Patent is:

I claim:

1. In an ejection apparatus having a seat means including a seat pan and a back supported on an ejection frame adapted to be selectively ejected relative to its foundation in response to actuation of a gas initiator means, the combination with: means pivotally connecting said seat pan and said back; means movably supporting said seat pan and back on said ejection frame for movement relative thereto into a first ejection attitude wherein said back is substantially parallel to said ejection frame and into reclining attitudes wherein said back is progressively angular relative to said ejection frame and said seat pan; actuator means connecting said seat pan and back and said ejector frame and being selectively operable for moving said seat pan and back relative to said ejection frame into said reclining attitudes; and means responsive to actuation of said initiator means for overriding said actuator means so as to automatically position said seat pan and back into said first ejection attitude prior to ejection of said seat means.

2. An apparatus as defined in claim 1, wherein said overriding means includes locking means responsive to positioning of said seat pan and back in said ejection attitude for locking said seat pan and back in said ejection attitude prior to ejection of said seat means.

3. An apparatus as defined in claim 2, including releasable holding means operatively associated with said actuator means for holding said actuator means in said reclining attitudes and releasable in response to actuation of said initiator means for activating said overriding means.

4. An apparatus as defined in claim 1, wherein said actuator means includes a cylinder member and piston means reciprocable in said cylinder member; powered operating means selectively operable for extending and retracting said piston means relative to said cylinder for adjusting the angular relative attitudes of said seat means in its reclining attitudes; releasable holding means for retaining said power operated means in operative association with said piston means; means for releasing said releasable holding means in response to actuation of said initiator means; and means responsive to actuation of said initiator means for biasing said piston to extend said cylinder for pivoting said seat pan and back into said first ejection position relative to said frame subsequent to release of said releasable holding means and prior to ejection of said frame.

5. In an ejector apparatus having a seat means including a seat pan and a back supported on an ejection frame adapted to be selectively ejected relative to its foundation in response to actuation of a gas initiator means, the combination with: means pivotally connecting said seat pan and said back; means movably supporting said seat pan and back on said ejection frame for movement relative thereto into an ejection attitude wherein said back is substantially parallel to said ejection frame and into reclining attitudes wherein said back is progressively angular relative to said ejection frame and said seat pan; actuator means connecting said seat pan and said ejector frame and being selectively operable for moving said seat pan and back relative to said ejector frame, said actuator means comprising: a cylinder having an open end and an opposite closed end pivotally secured to said seat pan and having an intake opening intermediate of said ends; a rotatable screw member having one end pivotally secured to said ejector frame and a piston at its opposite end extending into said open end of said cylinder; a nut member movably and non-rotatably mounted in said cylinder open end and engageable with said screw member; releasable holding means for holding said nut member in said cylinder; means for selectively rotating said screw member relative to said nut member for selectively extending and retracting said piston member relative to said cylinder for adjusting the angular attitude of said seat pan and back relative to said ejector frame; and means responsive to initiation of said initiator means for admitting gas under pressure through said intake opening and into said cylinder prior to ejection of said ejection frame so as to bias said piston outwardly of said cylinder, said releasable holding means being releasable to release said nut means in response to said admission of gas into said cylinder and said piston being subsequently movable outwardly of said cylinder so as to position said seat pan and back in said ejection attitude relative to said frame.

6. An apparatus as defined in claim 5, wherein said nut means is axially and non-rotatably movable relative to said cylinder and said releasable holding means includes: key means radially movable in said cylinder and engageable with said nut means for preventing axial movement of said nut means relative to said cylinder; sleeve means circumjacent to said cylinder and axially movable relative to said cylinder and engageable with said key means for holding said key means in engagement with said nut means; and second actuator means for moving said sleeve means in a direction to disengage said key means in response to admission of said gas under pressure to said cylinder, said key means being disengageable with said nut means in response to disengagement of said sleeve with said key means to release said nut means for movement with said piston means.

7. An apparatus as defined in claim 5, including: locking means for locking said piston relative to said cylinder when said actuator means is in said extended ejection attitude and positioned for preventing axial movement of said piston means relative to said cylinder when said seat pan and back is in said ejection attitude relative to said ejector frame means.

8. An apparatus as defined in claim 7, wherein said locking means includes means defining an annular internal groove in said cylinder and adjacent to said nut means thereof and an expandable annular member on said piston member and alignable with said groove when said actuator means is extended to position said seat pan and back in said ejection attitude relative to said ejection frame to expand therein, said expandable member being engageable with said piston means and said groove of said cylinder means when expanded and aligned with said groove so as to lock said piston to said cylinder means.

9. An apparatus as defined in claim 8, including limiting means for limiting axial movement of said piston means relative to said cylinder means so as to prevent engagement of said locking means prior to actuation of said initiator means to release gas into said cylinder, said limiting means being removable in response to actuation of said initiator means to permit said locking means to engage said groove for locking said seat means in said ejection attitude relative to said frame and prior to ejection of said frame.

10. In an ejection apparatus having a seat means including a seat pan and a back supported on an ejection frame adapted to be selectively relative to its foundation in response to actuation of a gas initiator means, the combination with: means movably supporting said seat pan and back on said ejection frame for movement relative thereto into a first ejection attitude wherein said back is substantially parallel to said ejection frame and into reclining attitudes wherein said back is selectively angularly relative to said ejection frame and said seat pan; actuator means connecting said seat pan and back and said ejection frame selectively operable for moving said seat pan and back relative to said ejection frame into said reclining attitudes; and second gas initiator means responsive to actuation of said first initiator means for over-riding said actuator means so as to automatically position said seat pan and back into said first ejection attitude prior to ejection of said ejection frame.

11. An actuator comprising: a cylinder having an open end and a closed end adapted to be secured to a first frame or the like and having an opening intermediate said ends adapted to selectively receive a charge of gas under pressure in response to initiation of a gas initiator or the like; piston means movable in said cylinder for linear movement relative thereto; piston rod means secured to said piston means for movement therewith and having an outer end opposed to said closed end adapted to be secured to a second frame for moving said second frame relative to said first frame in response to linear movement thereof relative to said cylinder; means for selectively rotating said piston rod means relative to said cylinder; motion translating means connecting said piston rod means and said cylinder for translating rotation of said piston rod means into a linear movement of said piston rod means relative to said cylinder so as to adjust the distance between said closed end of said cylinder and said outer end of said piston rod means, said motion translating means including an internally threaded nut member axially and non-rotatably movable relative to said cylinder in said open end and complementary external threads on said piston rod means, said external threads of said piston rod means being engaged with said internal threads of said nut member; releasable holding means for holding said motion translating means in connection with said piston rod means and said cylinder means, said releasable holding means including key means radially movable in said cylinder and engageable with said nut member for preventing axial movement of said nut member ber relative to said cylinder, sleeve means axially movable relative to said cylinder and engageable to said key means for holding said key means in engagement with said nut member, and second actuator means for moving said sleeve means in a direction to disengage said key means in response to admission of said gas under pressure into said cylinder, said key means being disengageable with said nut member in response to disengagement of said sleeve means with said key means for releasing said nut member for axial movement with said piston rod means; and releasing means operable responsive to receiving a charge of gas under pressure through said opening for releasing said releasable holding means, thereby permitting removal of said motion translating means from said body with said piston rod means and facilitating linear movement of said piston means responsive to gas pressure for extending said piston rod means a maximum distance.

References Cited in the file of this patent

UNITED STATES PATENTS

| | | |
|---|---|---|
| 2,304,781 | Dillon | Dec. 15, 1942 |
| 2,479,713 | Beach | Aug. 23, 1949 |
| 2,702,677 | Replogle | Feb. 22, 1955 |
| 2,709,556 | Jandris | May 31, 1955 |
| 2,726,831 | Bleck et al. | Dec. 13, 1955 |
| 2,815,008 | Hirt | Dec. 3, 1957 |
| 2,924,403 | Mohrlock | Feb. 9, 1960 |